United States Patent [19]

Graham

[11] Patent Number: 5,704,255
[45] Date of Patent: Jan. 6, 1998

[54] PUSH-PULL CONTROL WITH CRIMPED SWIVEL TUBE

[75] Inventor: Dennis Graham, Reading, Pa.

[73] Assignee: Teleflex Incorporated, Plymouth Meeting, Pa.

[21] Appl. No.: 723,888

[22] Filed: Oct. 1, 1996

[51] Int. Cl.⁶ ............................................ F16C 1/10
[52] U.S. Cl. ........................ 74/502.4; 74/502.6; 248/56
[58] Field of Search ........................ 74/502.4, 502.5, 74/502.6; 248/56

[56] References Cited

U.S. PATENT DOCUMENTS

| | | |
|---|---|---|
| 1,993,907 | 3/1935 | Williams . |
| 2,730,134 | 1/1956 | Morse . |
| 3,472,541 | 10/1969 | Hulten ............................ 248/56 X |
| 4,238,974 | 12/1980 | Fawcett . |
| 4,321,840 | 3/1982 | Kalamon ............................ 74/502.5 |
| 4,763,541 | 8/1988 | Speace ............................ 74/502.6 X |
| 4,872,367 | 10/1989 | Speace ............................ 74/502.6 |
| 4,895,041 | 1/1990 | Cunningham . |
| 5,546,827 | 8/1996 | Pospisil ............................ 74/502.6 |

Primary Examiner—Charles A. Marmor
Assistant Examiner—Saúl J. Rodriguer
Attorney, Agent, or Firm—Howard & Howard

[57] ABSTRACT

A motion transmitting remote control assembly (10) including a core element (12) movably supported by a conduit (16) with a unique swivel tube joint between a fitting (18) and a swivel tube (26) wherein a counterbore (34) is formed to define a female end in the swivel tube (26), the counterbore (34) being larger in diameter than the bore (27) in the swivel tube (26) which supports a core end rod (14). The swivel tube (26) is retained on the head (30) and groove (32) portion of the end fitting (18) by having deformations (38) crimped into the counterbored section of the swivel tube (26) with the deformations being spaced from the bottom of the groove (32).

9 Claims, 1 Drawing Sheet

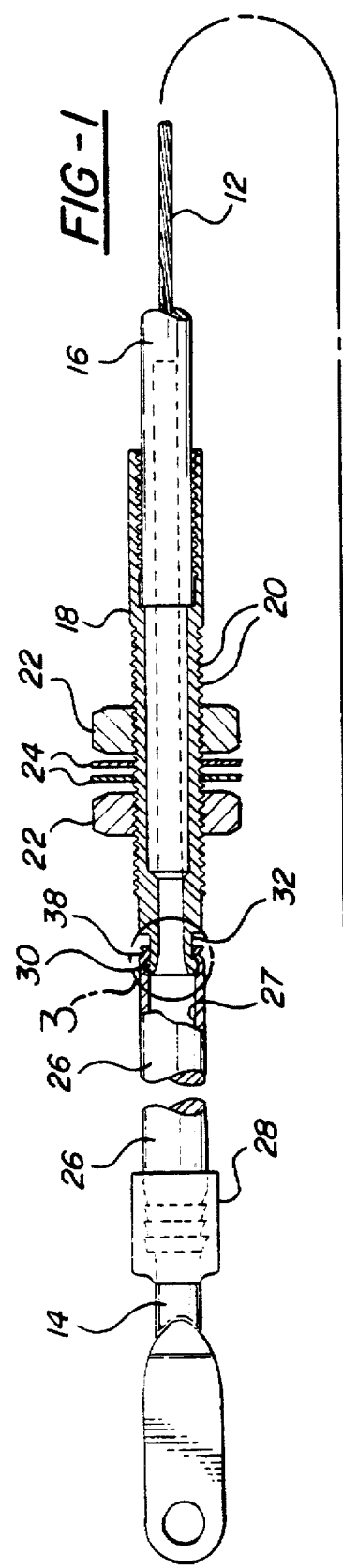
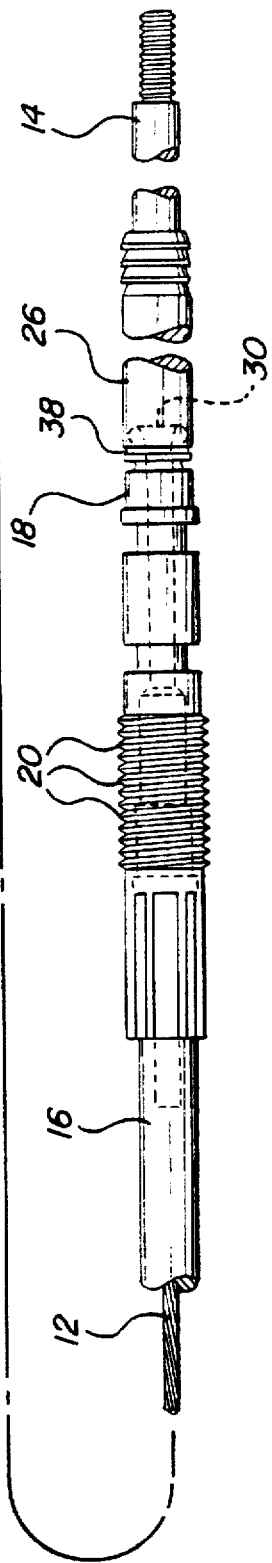
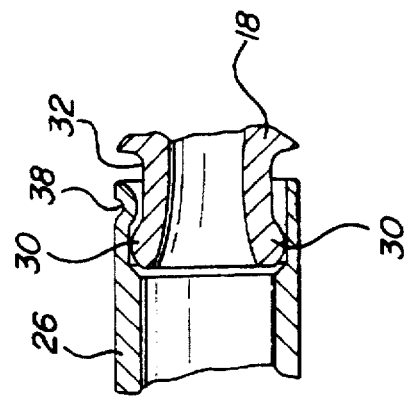
FIG-1
FIG-3
FIG-2

PUSH-PULL CONTROL WITH CRIMPED SWIVEL TUBE

TECHNICAL FIELD

The subject invention relates to a motion transmitting remote control assembly of the type for transmitting motion in a curved path by a flexible motion transmitting core element. More specifically, the invention relates to such assemblies in which the core element extends from the conduit through a swivel joint and into a swivel tube.

BACKGROUND OF THE INVENTION

In the control assemblies including such a swivel joint, the swivel tube presents a male spherical ball at its inner end which is disposed in a female spherical socket in the end of an end fitting attached to the end of the conduit. Examples of such assemblies are disclosed in U.S. Pat. Nos. 2,730,134 to Morse, 4,238,974 to Fawcett and 4,321,840 to Kalamon. Such assemblies require the swivel tube to have a specially manufactured spherical or ball shaped end for insertion into the end fitting. Additionally, the diameter of the rod slidably supported in the swivel tube controls the diameter of the swivel tube, which, in turn, determines the diameter or bulk of the fitting surrounding the spherical end of the swivel tube. Accordingly, if the diameter of the swivel joint can be reduced without reducing the diameter of the swivel tube, rods with a variety of different diameters may be used in an assembly.

The U.S. Pat. No. 1,993,907 to Williams discloses a tube clamped in a fixed position on a fitting in such a control assembly and the U.S. Pat. No. 4,895,041 to Cunningham discloses a swivel tube preformed or molded of a plastic material. However, neither of these patents provide the degree of simplicity of manufacture and assembly with the attendant durability and strength that the subject invention provides.

SUMMARY OF THE INVENTION AND ADVANTAGES

A motion transmitting remote control assembly of the type for transmitting motion in a curved path by a flexible core element and comprising a flexible motion transmitting core element movably supported by a conduit having first and second ends and a fitting disposed on the first end of the conduit. A swivel tube has a distal end and an inner end pivotally attached to the fitting at a swivel joint for swiveling movement relative to the fitting and movably supporting the core element. The fitting defines a male portion of the swivel joint and the swivel tube presents a female portion of the swivel joint and disposed about the male portion for swiveling movement about the male portion. The assembly is characterized by the swivel tube having a bore extending longitudinally therethrough and with the female portion defined by a counterbore extending into the inner end of the swivel tube to define a counterbored section.

The method of fabricating the motion transmitting remote control assembly is characterized by forming a male portion of the swivel joint on the fitting, forming a female portion of the swivel joint by forming a counterbore extending into the inner end of the swivel tube to define a counterbored section, and disposing the counterbored section about the male portion for swiveling movement about the male portion.

Therefore, the subject invention provides such a remote control assembly wherein the manufacture of the swivel tube is greatly simplified and wherein the diametrical size of the fitting may be relatively smaller yet retaining the capacity to house a relatively larger core element rod.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a side elevational view partially broken away and in cross section of a preferred embodiment of the subject invention;

FIG. 2 is an enlarged cross sectional view of the counterbored end of the swivel tube; and FIG. 3 is an enlarged cross sectional view of the swivel joint of the subject invention;

DETAILED DESCRIPTION OF THE PREFERRED EMBODIMENT

Referring to the Figures, wherein like numerals indicate like or corresponding parts throughout the several views, a motion transmitting remote control assembly of the type for transmitting motion in a curved path is generally shown at 10. The assembly 10 includes a flexible motion transmitting core element 12, which typically includes a solid metal wire but may comprise a plurality of metal filaments stranded together. As will become more clear as the description continues, the core element 12 also includes a rod 14 secured to the end of the wire core, the rod 14 having a flat end with a hole or threads for attachment to a control member. A conduit 16 has first and second ends and movably supports the solid wire core element 12. The conduit 16 typically comprises an inner tubular lining of plastic and surrounded by long lay wires helically wound around the inner tubular lining and encased in an extruded plastic casing.

A fitting 18 is disposed on the first end of the conduit 16. The fitting 18 is made of metal and includes a threaded portion 20 adjacent the end for mounting the fitting 18 to a support structure, such as a bulkhead or bracket. A pair of nuts 22 threadedly engage the threaded portion 20 with a pair of washers 24 disposed therebetween for sandwiching the support structure between the washers 24 as the nuts 22 are tightened together.

A metal swivel tube 26 has a distal end supporting a cap seal 28 in sealing engagement with the rod 14 and an inner end pivotally attached to the fitting 18 at a swivel joint for swiveling movement relative to the fitting 18 and movably supporting the rod 14 of the core element. The rod 14 is slidably supported in a bore 27 in the swivel tube 26 and extends from the distal end of the swivel tube 26.

The assembly 10 is characterized by the fitting 18 defining a male portion of the swivel joint and the swivel tube 26 presenting a female portion of the swivel joint and disposed about the male portion for swiveling movement about the male portion. More specifically, the male portion includes an annular head 30 at the end of the fitting 18 and a groove 32 adjacent the head 30, the groove 32 being between the head 30 and the threaded portion 20 of the fitting 18. The head 30 is doughnut shaped or bulbous or spherical to define the ball of a ball and socket joint. The female or socket portion of the swivel joint is defined by a counterbore 34 extending into the inner end of the swivel tube 26 to define a counterbored section ending in a shoulder 36, i.e., the counterbore 34 is larger than the bore 27 and is of a constant diameter. At least one deformation 38 is disposed along the counterbored section and extends radially inwardly and into the groove 32 of the male portion for retaining the swivel tube 26 on the fitting 18 for the swiveling movement. The deformation 38 may comprise one completely annular waist or a plurality of circumferentially or annularly spaced protrusions on the interior of the counterbored section of the swivel tube 26. But importantly, the one or more deformations are radially spaced from the bottom of the groove 32 to provide a radial space between the deformation 38 and the groove 32 to facilitate or provide the swiveling movement.

In accordance with the subject invention a method is provided for fabricating such a motion transmitting remote control assembly 10 by forming a male portion of the swivel joint on the fitting 18, forming a female portion of the swivel joint by forming a counterbore 34 extending into the inner end of the swivel tube (26) to define a counterbored section, and disposing the counterbore 34 about the male portion for swiveling movement about the male portion. The method is further defined as forming an annular head 30 at the end of the fitting 18 and forming a groove 32 in the fitting 18 adjacent the head 30. A further definition includes forming the counterbore 36 extending into the inner end of the swivel tube 26 to a shoulder 36 with a larger diameter than the diameter of the bore 27 in the remainder of the swivel tube 26. The method includes forming at least one deformation 38 along the counterbored section and extending radially inwardly and into the groove 32 of the male portion for retaining the swivel tube 26 on the fitting 18 for the swiveling movement while simultaneously limiting the extent of the deformation 38 radially into the groove 32 to provide a radial space between the deformation 38 and the groove 32 to facilitate the swiveling movement. The deformations 38 are formed by crimping the swivel tube 26.

Although only one end of the assembly 10 is shown, it will be obvious that the other end could be a duplicate of the end shown, or any one of many configurations known in the art.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion transmitting remote control assembly (10) for transmitting motion in a curved path by a flexible core element, said assembly (10) comprising:

a flexible motion transmitting core element (12), a conduit (16) having first and second ends and movably supporting said core element (12), a fitting (18) disposed on said first end of said conduit (16), and a swivel tube (26) made of metal and having a distal end and an inner end pivotally attached to said fitting (18) at a swivel joint for swiveling movement relative to said fitting (18) and movably supporting said core element (12), said fitting (18) defining a male portion of said swivel joint and said swivel tube (26) presenting a female portion of said swivel joint disposed about said male portion for swiveling movement about said male portion, said swivel tube (26) having a bore (27) extending longitudinally therethrough and said female portion is defined by a counterbore (34) extending into said inner end of said swivel tube (26) to define a counterbored section, said male portion including an annular head (30) at the end of said fitting (18) and a groove (32) adjacent said head (30), said counterbore (34) being larger than said bore (27), said swivel joint being further defined by at least one deformation (38) disposed along said counterbored section and extending radially inwardly and into said groove (32) of said male portion for retaining said swivel tube (26) on said fitting (18) for said swiveling movement, said deformation (38) being radially spaced from said groove (32) to provide a radial space between said deformation (38) and said groove (32) to facilitate said swiveling movement.

2. An assembly as set forth in claim 1 including a plurality of said deformations (38) spaced annularly about said counterbored section of said swivel tube (26).

3. An assembly as set forth in claim 2 wherein said fitting (18) is made of metal.

4. An assembly as set forth in claim 3 wherein said fitting (18) includes a threaded portion (20) adjacent said groove (32) for mounting said fitting (18) to a support structure.

5. An assembly as set forth in claim 4 including a pair of nuts (22) threadedly engaging said threaded portion (20) for sandwiching a support structure therebetween.

6. An assembly as set forth in claim 1 wherein said core element (12) includes a rod (14) slidably supported in said swivel tube (26) and extending from said distal end of said swivel tube (26).

7. A method of fabricating a motion transmitting remote control assembly (10) for transmitting motion in a curved path by a flexible core element (12) movably supported in a conduit (16) having a first fitting (18) disposed on the end of the conduit (16) and a swivel tube (26) made of metal and having a distal end and an inner end pivotally attached to the fitting (18) at a swivel joint for swiveling movement relative to the fitting (18) and movably supporting the core element (12) in a bore (27) extending between the distal and inner ends thereof, forming an annular head (30) at the end of the fitting (18) and forming a groove (32) in the fitting (18) adjacent to the head (30) forming a female portion of the swivel joint in the inner end of the swivel tube (26) by forming a counterbore (34) of a larger diameter than the diameter of the bore (27) and extending into the inner end of the swivel tube (26) to define a counterbored section, and disposing the counterbore (34) about the male portion for swiveling movement about the male portion, forming at least one deformation (38) disposed along the counterbored section and extending radially inwardly and into the groove (32) of the male portion for retaining the swivel tube (26) on the fitting (18) for the swiveling movement, limiting the extent of the deformation (38) radially into the groove (32) to provide a radial space between the deformation (38) and the groove (32) to facilitate the swiveling movement.

8. A method as set forth in claim 7 further defined as forming a plurality of the deformations (38) spaced annularly about the counterbored section of the swivel tube (26).

9. A method as set forth in claim 7 further defined as forming the deformation (38) by crimping the swivel tube (26).

* * * * *